INVENTOR
Edward F. Kleinschmidt
BY Strauch & Hoffman
ATTORNEYS

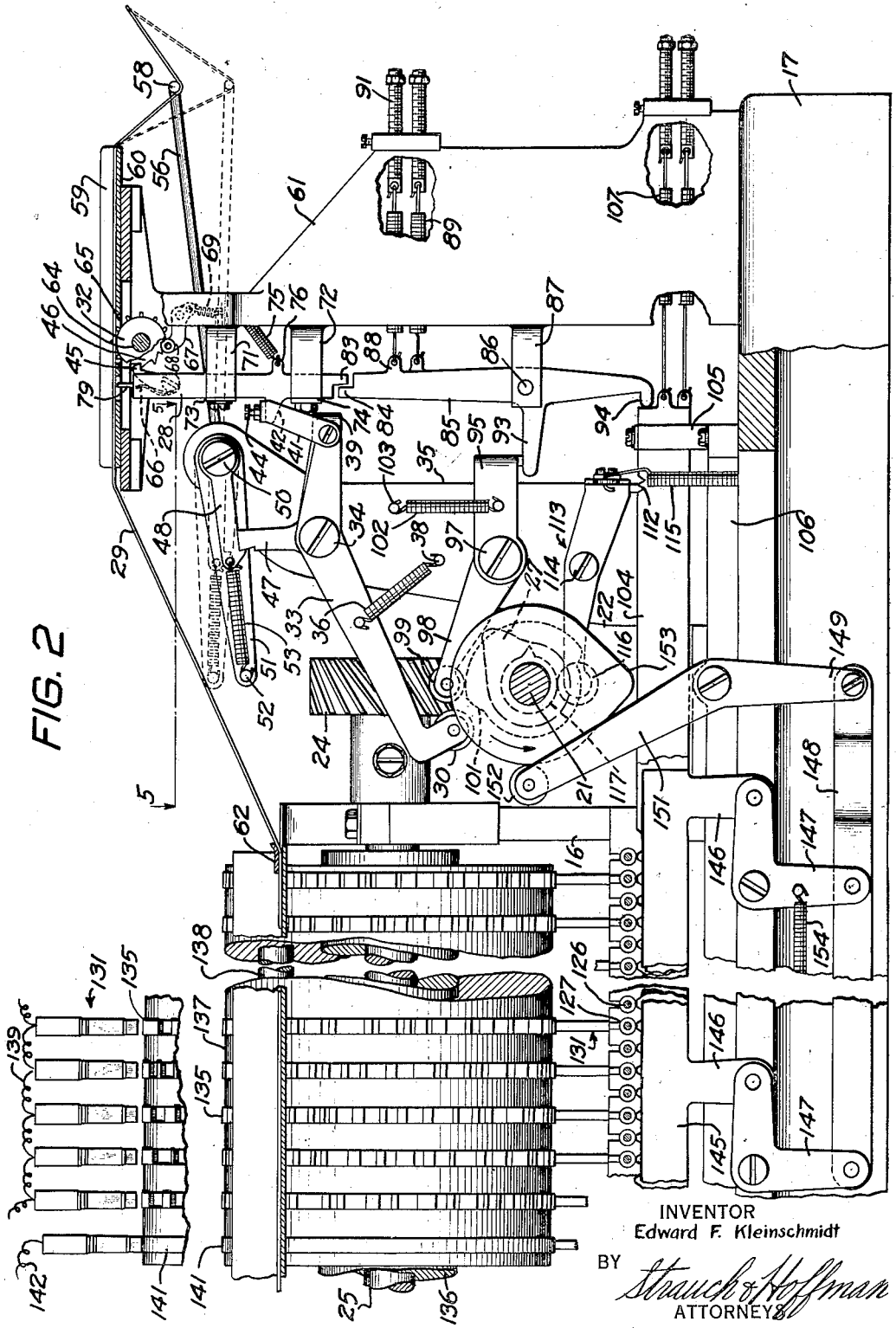

May 7, 1935. E. F. KLEINSCHMIDT 2,000,083
FACSIMILE PRINTING TELEGRAPH SYSTEM AND APPARATUS
Filed Nov. 1, 1930 7 Sheets-Sheet 3
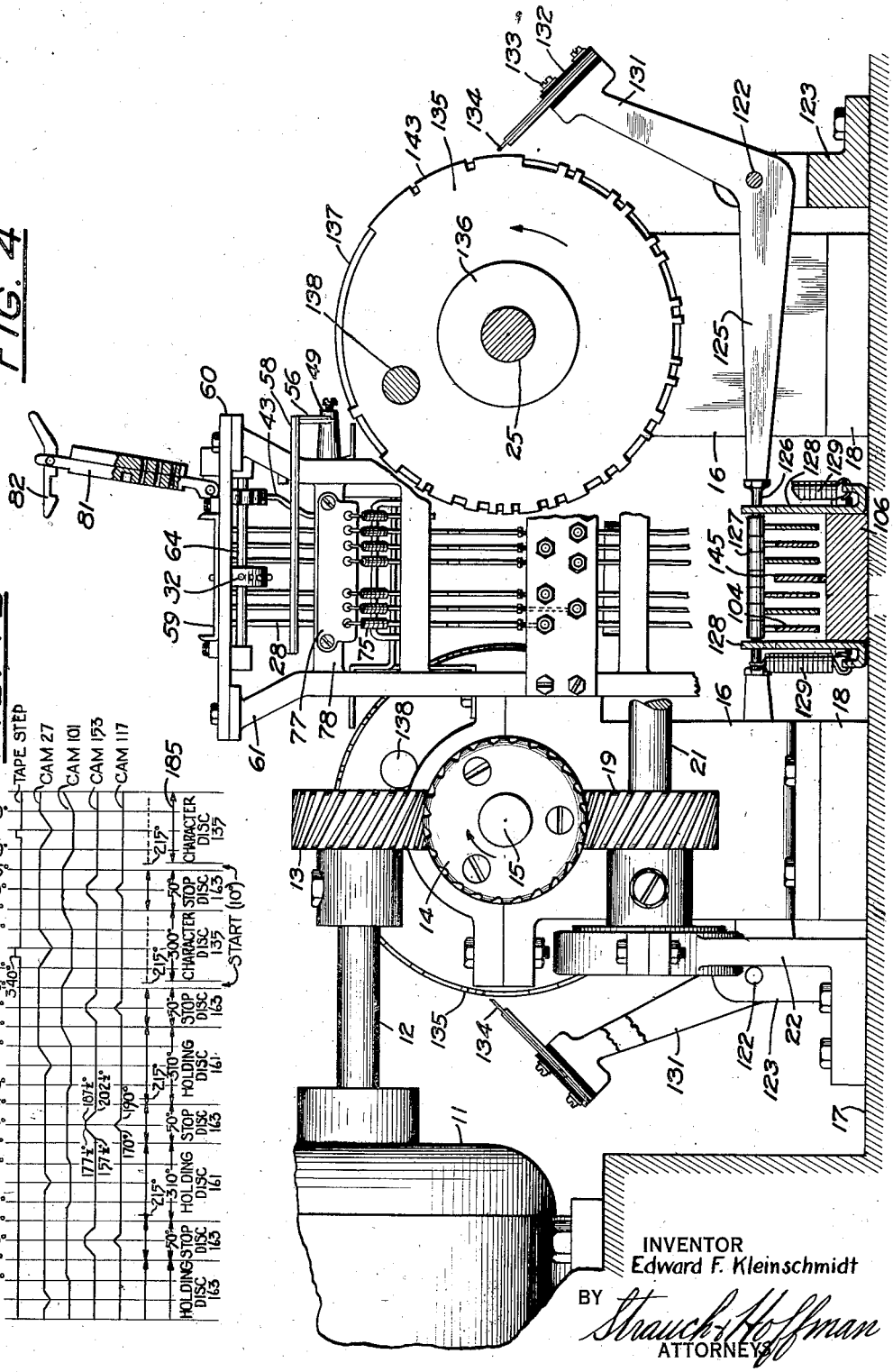
INVENTOR
Edward F. Kleinschmidt
BY
ATTORNEYS May 7, 1935. E. F. KLEINSCHMIDT 2,000,083
FACSIMILE PRINTING TELEGRAPH SYSTEM AND APPARATUS
Filed Nov. 1, 1930 7 Sheets-Sheet 4
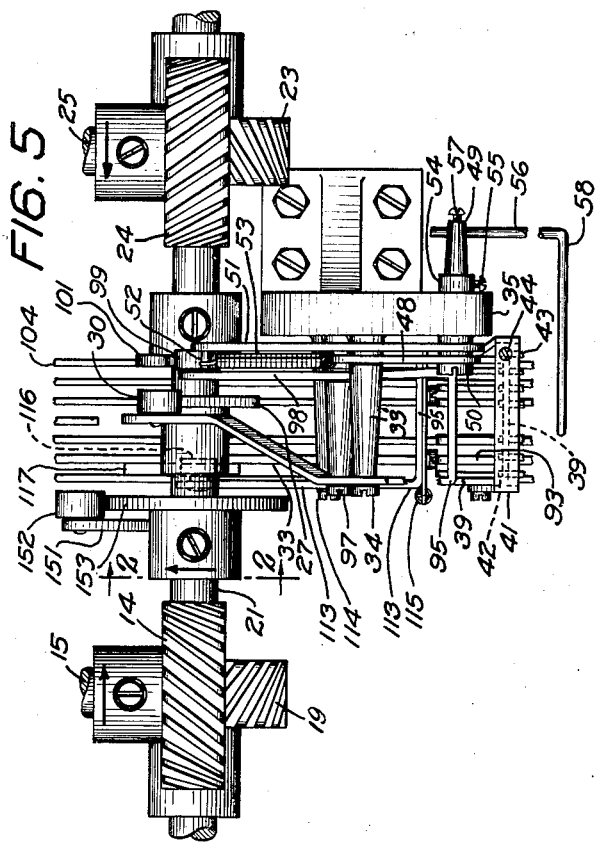
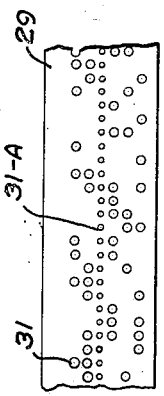
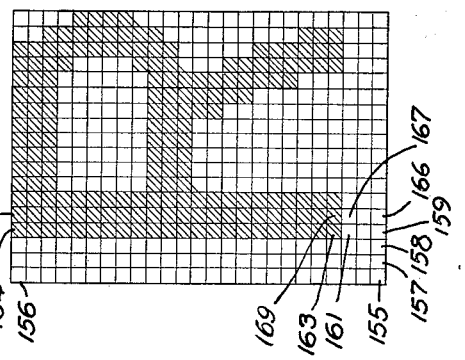
INVENTOR
Edward F. Kleinschmidt
BY
*Strauch & Hoffman*
ATTORNEYS May 7, 1935.　　　E. F. KLEINSCHMIDT　　　2,000,083
FACSIMILE PRINTING TELEGRAPH SYSTEM AND APPARATUS
Filed Nov. 1, 1930　　　7 Sheets-Sheet 5
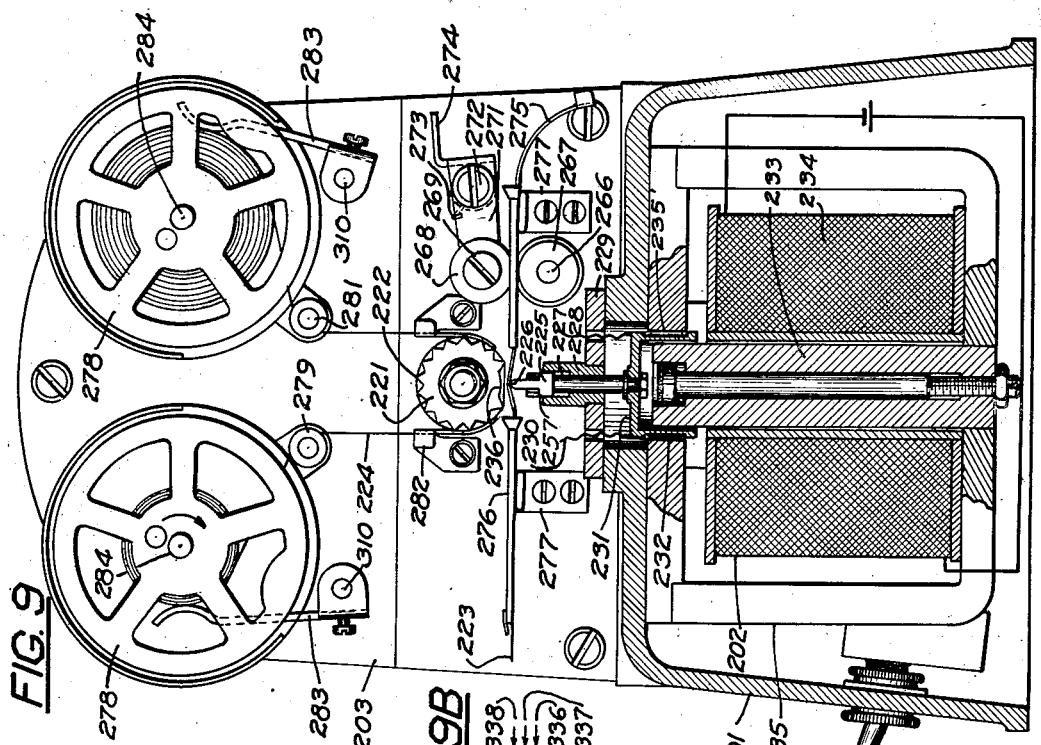
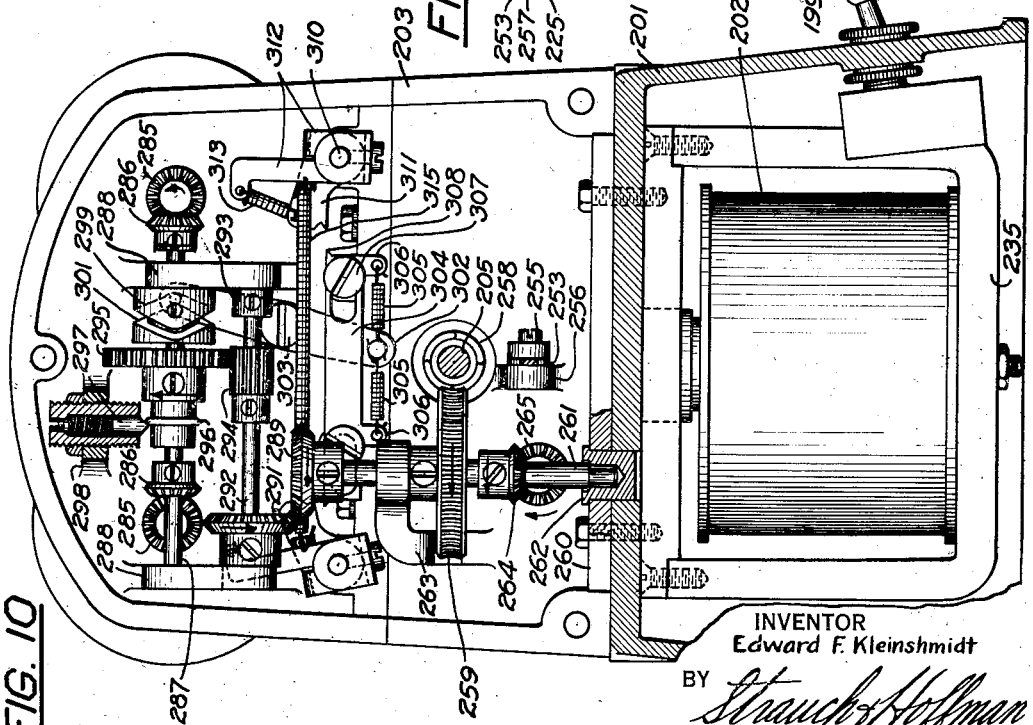
INVENTOR
Edward F. Kleinshmidt
BY
ATTORNEYS

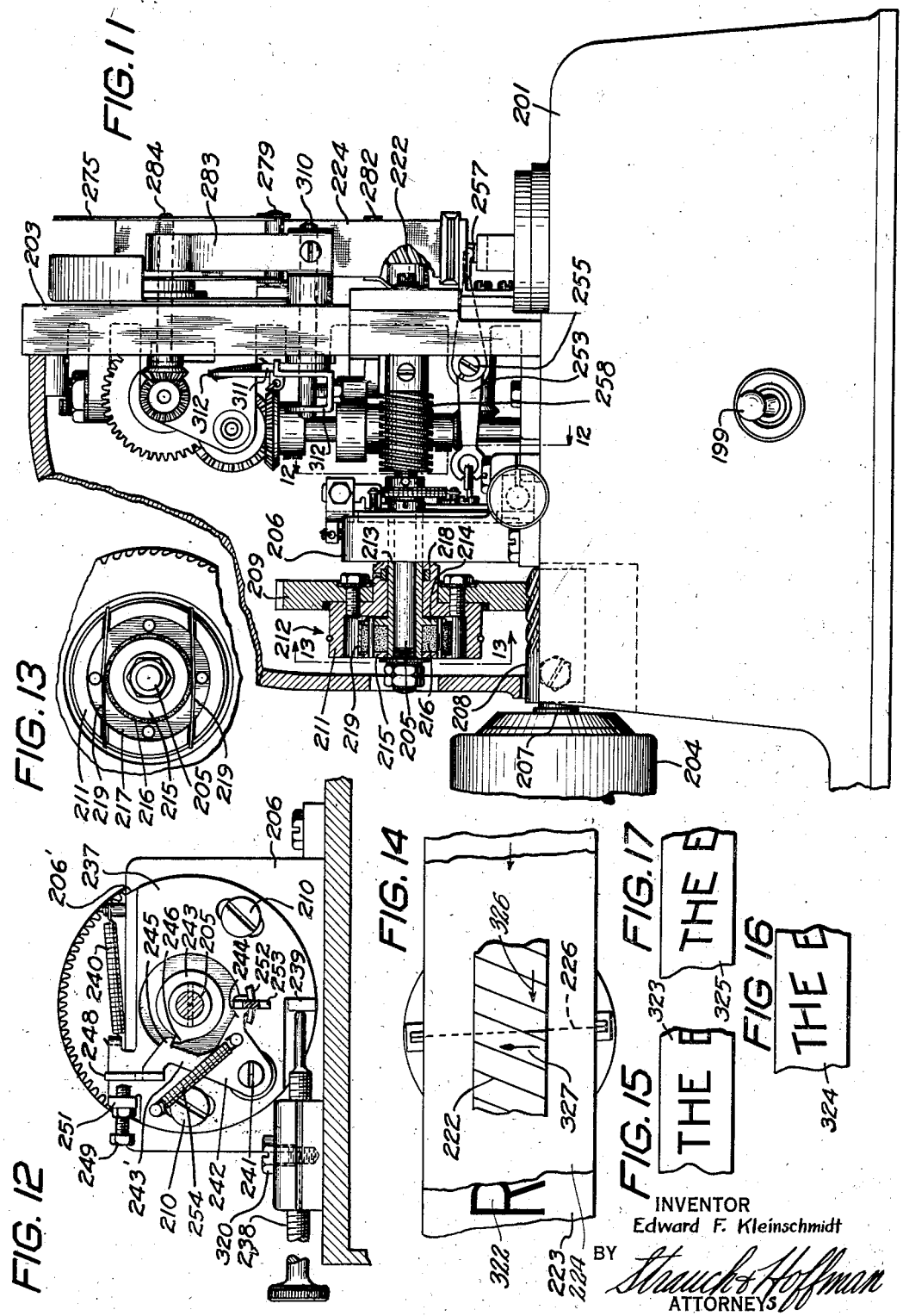

May 7, 1935. E. F. KLEINSCHMIDT 2,000,083
FACSIMILE PRINTING TELEGRAPH SYSTEM AND APPARATUS
Filed Nov. 1, 1930 7 Sheets-Sheet 7
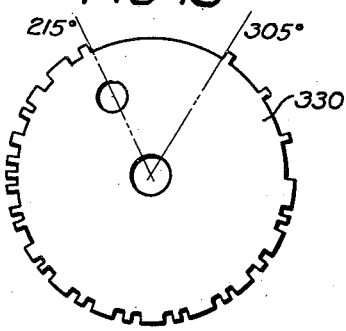
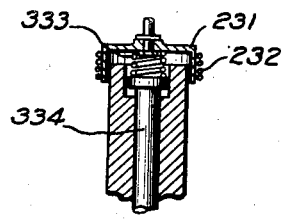
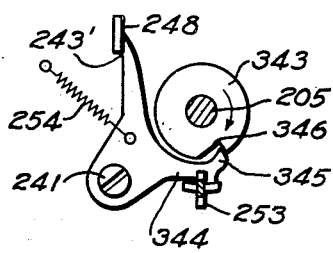
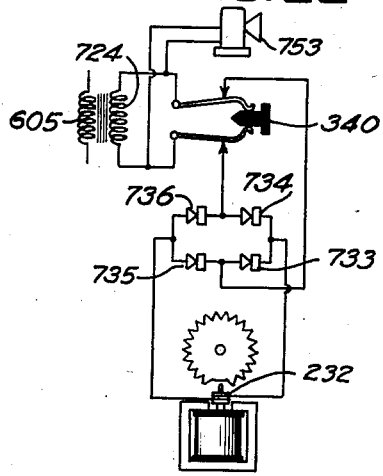
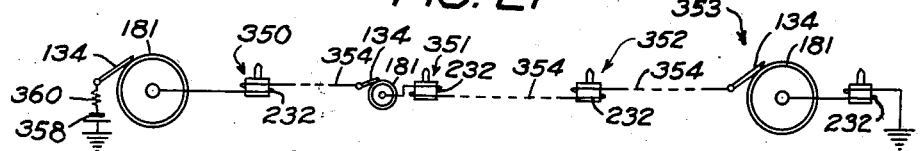
INVENTOR
Edward F. Kleinschmidt
BY Strauch & Hoffman
ATTORNEYS Patented May 7, 1935

2,000,083

UNITED STATES PATENT OFFICE 2,000,083

FACSIMILE PRINTING TELEGRAPH SYSTEM AND APPARATUS

Edward F. Kleinschmidt, Chicago, Ill., assignor to Teletype Corporation, Chicago, Ill., a corporation of Delaware Application November 1, 1930, Serial No. 492,855

15 Claims. (Cl. 178—5)

This invention pertains to telegraphic systems of automatic type, in which a record is made either in directly legible characters of any plain language, or in code characters, or in telegraphic code.

The present invention relates more specifically to telegraph systems in which each letter or symbol is scanned or analyzed into a succession of constituent elemental areas of positive and negative surfaces. The positive or negative nature of each such elemental area then is communicated by a telegraphic signal from the sender to the receiver and is recorded upon a receiving surface according to the nature of the signal.

The present application is a continuation-in-part of application Serial Number 475,264, filed August 14th, 1930 by E. F. Kleinschmidt and another, entitled "Facsimile printing telegraph systems and apparatus".

The general object of this invention is to provide a complete, novel operating system and apparatus of the character mentioned, for making a type record of matter composed of a series of unit symbols, in which permanent transmitting control elements are provided for each symbol, and a printing-receiver record is made directly by the received signals.

Another object of this invention is to provide a system and apparatus adapted for use in conjunction with an ordinary radio broadcast receiving set, whereby vocal or musical signals may be reproduced by a loudspeaker, or messages may be directly printed by a printing receiver, alternatively.

Another object of this invention is to provide a system and apparatus for the transmission of messages, in which the messages are reproduced by printing receivers utilizing facsimile type reproductions, and in which proper phase relation of receivers with respect to incoming signals is maintained by novel start stop control methods especially adapted for use in radio reception, although not limited thereto.

The more specific objects of the invention are:

To provide telegraphic transmitters and receivers especially suitable for use with radio and like high frequency systems due to their directness and simplicity, absence of contacting devices at the receiver, and ease of speed control.

To provide receiving mechanisms for which a high accuracy of synchronizing, necessary in prior facsimile telegraph systems is not required, and also to provide receiving equipment of such simplicity that its expense is justified by a small volume of traffic or as an entertainment or amusement item. In the commercial use of known systems of this class, extreme accuracy has been required in the regulation of the relative speeds of the receivers, and this requirement in such systems limits their use to stations where a considerable equipment at a considerable expense can be justified by the volume or by the importance of the traffic.

To provide a system in which no special speed control is needed in the sender or receiver and in which the speed of the receiver is independent of the signals.

To provide a system in which the speed of the receiving printer is adjustable within the judgment of the receiving operator.

To provide a simple system of signals which are especially suitable for transmission by radiant energy.

To provide a novel sender that will produce signals, the elements of which are composed of an alternating current and of such frequency that it can be transmitted on radio systems.

To provide a sender for facsimile type transmission in which prescanning is embodied, and to provide a sender which may be started into operation by a keyboard, a perforated tape control, or by any of the well known methods of control used in typewriting telegraphs.

To provide a facsimile receiver using novel start-stop speed correction, and in which starting and stopping of the receiver printer is controlled from the transmitter.

To provide a receiver in which the motor-speed my be regulated independently of any mechanical or electrical control derived from the speed of the sender.

These objects are accomplished by combining methods which are characteristic primarily of type-printing telegraphs and of facsimile telegraphs, in a manner which will effect transmitting and recording of individual characters; by providing sending devices which will effect signalling within the range of voice frequency; by providing receiving and recording devices which will be quickly responsive to telegraphic signals; and by providing novel mechanical details in both transmitter and receiver.

Where the system of this invention is used for the transmission of a fixed set of characters such as letters and numerals, a high accuracy of scanning is achieved by providing a system of mechanical prescanning.

Further objects of this invention are to provide a receiving recorder which will be affected in a minimum degree by interference impulses in the signal circuit whereby the effect of static upon the legibility of the record is minimized; in which the speed of the receiver is adjusted by visual inspection of the recorded characters; in which the received signals directly or after suitable amplification directly produce a record immediately legible without the necessity of photographic development or chemically prepared materials; in which direct mechanical recording from the armature of a polarized magnet is effected; which may be used in place of the loud speaker in an ordinary broadcast receiving set; and which will respond to any frequency within the voice frequency range.

These and other objects will be apparent from the following description and appended claims when taken in connection with the drawings, wherein Figure 1 is a diagram of one circuit arrangement connecting a transmitter and receiver.

Figure 2 is a side elevation, parts being shown in section, of one form of transmitter.

Figure 3 is a plan of a part of Figure 4.

Figure 4 is a partial end elevation looking from the right of Figure 2, parts thereof being shown in section.

Figure 4B is a timing chart for the several cams and for the transmitted signals.

Figure 5 is a broken plan taken on line 5—5 of Figure 2.

Figure 6 shows one form of cross perforated tape which may be used to control the transmitter.

Figure 7 is an elevation of one transmitting disc for sending character signals.

Figure 7B is an elevation of the transmitting disc for sending the stop signal between character signals.

Figure 7C is an elevation of the transmitting disc for sending the holding signal during suspension of transmission.

Figure 8 shows the analysis of a character for scanning; the character corresponding to the disc of Figure 7.

Figure 9 is an end elevation of one form of receiver, parts being shown in section.

Figure 10 is a view similar to Figure 9 taken in the opposite direction.

Figure 11 is a front elevation of the receiver of Figures 9 and 10, parts being broken away and in section.

Figure 12 is a section taken substantially on line 12—12 of Figure 11.

Figure 13 is a section taken substantially on line 13—13 of Figure 11.

Figure 14 is a diagram of the printing elements of the receiver of Figures 9, 10 and 11, showing the record tape, and a development of the printing edges of the printing wheel.

Figure 15 shows a normal record tape as made by the receiver of Figures 9, 10 and 11.

Figure 16 shows a record tape made when the receiver was running slightly above desirable speed.

Figure 17 shows a record tape made when the receiver was running below desirable speed.

Figure 18 shows a code disc in which the scanning units are reversed, a high arc being used for a white unit area and a low arc being used for a black unit area.

Figure 19 shows a detail of the device of Figure 9, the platen being supplied with a normaling spring which pushes the platen upward.

Figure 20 shows a start-stop latching mechanism, similar to Figure 12 but reversed in its latching detail.

Figure 21 shows a transmission system of several stations connected by line conductors.

Figure 1:
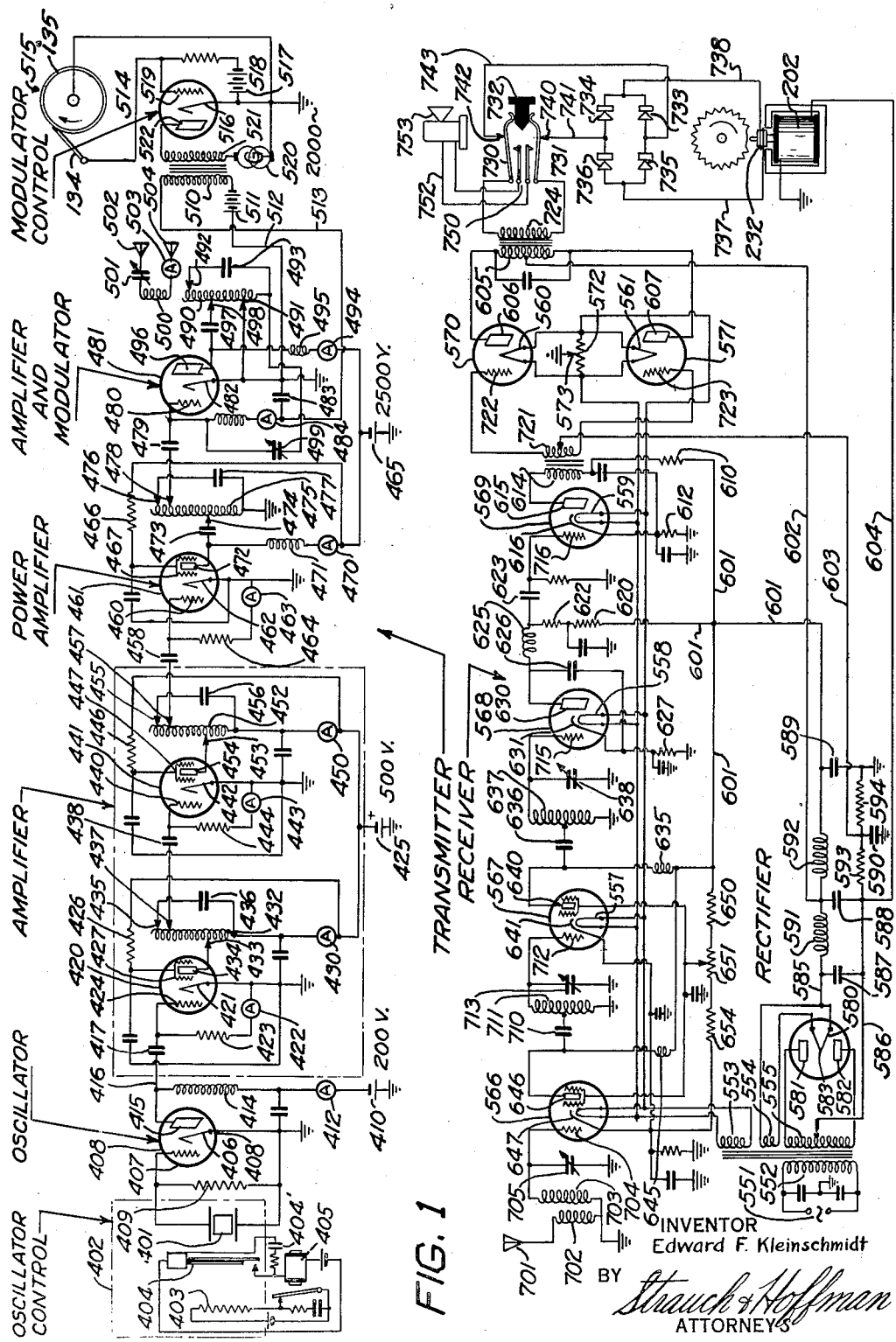

Figure 9—B shows a detail of operating elements of Figure 9.

Figure 22 shows an alternative method of connecting my improved facsimile printer to a radio telephone receiving set.

The description of this invention will begin with the transmitting apparatus, then proceed to the receiving apparatus and then the system connecting the transmitter and receiver will be described.

*Transmitting apparatus*

A detailed description of the construction of the preferred form of the transmitting apparatus or sender employed in the system herein disclosed will now be given.

Having reference to Figure 4, prime mover 11 operates shaft 12 to the end of which is secured spiral gear 13 adapted to mesh with spiral gear 14 on one end of code disc shaft 15. Code disc shaft 15 is journalled in bearings mounted in suitable standards or brackets 16, mounted on an insulating plate 18 which is fixed upon the base 17 of the sender. The object of the plate 18 is to insulate the shaft 15 from the grounded base 17 because the shaft 15 is in electrical engagement with the code discs which form a part of the electrical circuit of the transmitter.

Gear 14 in turn meshes with spiral gear 19 carried on main operating shaft 21. Shaft 21 is journalled in brackets 22, fixed to base 17. Similarly fixed to shaft 21 near the opposite end thereof is spiral gear 23, Figure 5, adapted to mesh with spiral gear 24 carried on second code-disc shaft 25. Shaft 25 is parallel to shaft 15 and likewise is journalled in brackets 16. Shafts 15 and 25 turn in opposite directions to facilitate mounting and operating the brushes which engage the code discs carried upon the shafts.

Gears 14, 19, 23 and 24 are so related that the speed of the three shafts 15, 21, 25 is the same. Gears 14 and 24 are insulating in nature to insulate the code-disc shafts 15 and 25 from the frame 17. They may be of such material as bakelite for reasons of insulation, wear and quiet running.

Referring to Figures 2 and 5, operating shaft 21 carries four cams.

Cam 27 draws down the feeler slides 28, of which there are six shown, and releases the slides at the proper time in the cycle of operation to permit the slides to rise under control of tape 29 as determined by holes in the tape, the slides 28 being sufficient in number to detect all code holes in the tape 29. Tape 29 may be of any form. A suitable six-unit cross-perforated tape is shown in Figure 6.

In the present embodiment, the tape as shown in Figure 6 has transverse rows of holes 31, each row having six code hole positions and representing a character or signal. Tape 29 is also provided with a series of feed perforations 31A which cooperate with the teeth of feed wheel 32, Figure 2, for advancing the tape in a step-by-step manner as will presently be described. Tape 29 may be prepared by a keyboard perforator or by a receiving reperforator of any desired construction.

Cam 27 engages cam follower roller 30 on cam follower lever 33 pivoted at 34 to bracket or support 35, which in turn mounted on base 17 of the sender. Cone 33' Figure 5 is fixed at both ends to the cam follower 33, as by brazing or by upsetting, thus forming an integral member having roughly the shape of an Arabic numeral 6 as viewed from above in Figure 5. The cone is drilled through and is carried pivotally by the shouldered screw 34 which is fixed rigidly in a boss on the bracket 35. Lever 33 normally tends to rotate in a counter-clockwise sense under the influence of spring 36, attached to lever 33, and to spring post 38 fixed to support 35. Lever 33 is provided with a substantially U-shaped arm 39 adapted to have attached to the end thereof a U-shaped member 41 which in turn is adapted to span and engage all lugs 42 of the six feeler levers 28 and of a tape feed slide 43 (Figure 4). Mounted on the cross piece of the U-shaped member 41 and disposed above and cooperating with lug 42 of tape feed lever 43 is an adjusting screw 44 adapted to control the engagement of feed pawl 45 and tape feed ratchet 46, as will presently appear.

Lever 33 is also provided with a substantially vertical arm 47 (Figure 2), the end of which is fashioned for engagement with pawl member 48, loosely mounted on shoulder screw 50 in pivot shaft 49 journalled in bracket 35. Fixed to pivot shaft 49 for rotation therewith and adapted to be associated with pawl 48 is stop arm 51. Secured to the end of arm 51 is spring post 52 to which is secured one end of spring 53, the other end of which is secured to the end of pawl 48. Thus pawl 48 may be held in operative relation with the arm 47 of lever 33.

Referring to Figure 5, it is observed that pivot shaft 49 is operatively held in its bearing in bracket 35 by a collar 54 which is adjustably fixed to said shaft 49 by set screw 55. In the present embodiment pivot shaft 49 is provided near its free end with a hole through which tape stop rod 56 is adapted to be threaded. Rod 56 is adapted to be adjustably secured to pivot shaft 49 by means of set screw 57. Rod 56 is provided with laterally disposed arm 58 adapted to engage tape 29.

As appears in Figure 2, the tap 29, as it approaches the sender from the right, passes under arm 58 of rod 56, thence through the tape guide 59, which is suitably mounted on a tape guide plate 60 and which in turn is appropriately mounted on mounting frame 61 fixed to base 17. Thence tape 29 passes through guide 62 to a receiver for used tape.

Thus oscillation of tape rod 56 and its associated assembly of tape spring arm 51, etc., is controlled by the alternate tautness and slackness of tape 29. As tape 29 becomes taut, it tends to rotate the tape rod 56 and its associated parts in counter-clockwise sense to the full line position of Figure 2, and thus positions pawl 48 for engagement with co-acting arm 47. The resiliency of the spring-held connection between pawl 48 and arm 51 prevents the tape 29 from being torn or severed in case pawl 48 and arm 47 are not in engaging relation. The tape stop arm assembly normally tends to rotate in a clockwise direction due to the over-balancing effect of the stop arm member 56 on the spring arm member 51. Thus while tape 29 is slack the tape stop assembly will assume the dotted position shown in Figure 2, holding pawl 48 out of operative relation with arm 47.

Appropriately journalled in mounting frame 61 is shaft 64 to which are fixed feed ratchet wheel 46 and feed or sprocket wheel 32. The tape guide 59 is slotted to permit the teeth of sprocket 32 to extend through to engage feed holes 31A (Figure 6) of tape 29.

Suitably mounted near the top of tape feed lever 43 is tape feed pawl 45 (Figure 2), which is adapted to co-act with tape feed ratchet 46 to effect rotation thereof in a step-by-step manner, thus imparting similar rotation to shaft 64 and feed or sprocket wheel 32. Pawl 45 is adapted to be spring pressed against the ratchet 46 by a suitable spring 66. Appropriately mounted in frame 61 and in cooperative relation with ratchet 46 is detent member 67 with detent roller 68 and spring 69.

Properly positioned in slide guides 71 and 72 of mounting frame 61 are previously mentioned feeler slides 28 (of which there are six in the present instance) and tape feed slide 43, said slides being held in the grooves by retaining plates 73 and 74. Each of said levers 28 and 43 is provided with its individual spring 75, each spring extending from a lug 76 on its associated lever to common spring bracket 77 (Figure 4, Sheet 3) fixed to cross tie 78 of mounting frame 61. Said levers 28 and 43 thus are urged upwardly by their springs 75 unless prevented by the previously described member 41 associated with follower lever 33.

Each feeler slide 28 is provided with its individual feeler pin 79 mounted in the upper end of each slide and adapted to cooperate with code perforations 31 in tape 29, and similar holes in tape retaining member 81 hinged at the side of tape guide 59 as shown in Figure 4. Member 81 is provided with a suitable latch 82 adapted to hold said member down with block 81 entering between upstanding flanges on tape guide 59. Member 81 allows the tape to pass easily and prevents the unselected feeler pins 79 from forcing the tape upward due to tension of springs 75. Thus when cam follower roller 30 of follower lever 33 is in contact with the low part of cam 27 the follower lever assumes its counterclockwise position due to the action of spring 36 and member 41 assumes its uppermost position. The feeler slides 28 then are free to move upwardly due to the tension of their individual springs 75. However, only those slides 28 will move whose individual feeler pins 79 have found a code perforation 31 in the superimposed tape 29.

Simultaneously tape feed slide 43 carrying tape feed pawl 45 is also permitted to assume its uppermost position such that pawl 45 is permitted to engage the next tooth of ratchet 46 preparatory to effecting the rotation of ratchet 46 one step, which rotation will be effected by the downward movement of tape feed slide 43, when follower lever 33 again moves clockwise which occurs when the follower roller 30 again is engaged by the high part of the cam 27.

Each feeler slide 28 is also provided with its stop lug 83, adapted to cooperate with a testing finger 84 on the end of transfer levers 85 which are equal in number to the tape feeler slides 28 to which they correspond severally. The six transfer levers 85 are pivotally mounted independently upon common pivot shaft 86 suitably held in a pair of brackets 87 integral with mounting frame 61.

Each transfer lever is provided with a lug 88 to which is secured one end of an individual spring 89, the other end being connected to an adjusting screw 91. Transfer levers 85 thus normally tend to rotate in a clockwise sense due to the action of their individual springs 89. Each transfer feeler 85 is also provided with a reset lug 93 and power lug 94.

Reset lugs 93 (six in number in the present instance) are adapted to be spanned by reset bail arm 95 of the transfer feeler reset bail lever 98. Said lever 98 is pivotally mounted at 97 on the bracket 35, and carries cam follower roller 99 adapted to engage the periphery of reset cam 101 due to spring 102, secured to bail arm 95 and to spring post 103 fixed to bracket 35. Cam 101 is mounted on and driven by shaft 21.

Cam follower roller 99 normally engages the high part of cam 101 thus maintaining reset bail 95 in its extreme clockwise position, as shown in Figure 2, against the action of spring 102. Bail arm 95 by its cooperation with reset lugs 93 thus normally holds transfer levers 85 in their counterclockwise position against the action of individual springs 89 and away from lugs 83, to permit the free operation of the feeler slides 28. Therefore, when cam follower roller 99 engages the low part of reset cam 101, reset lever 98 will rotate in a counterclockwise sense under the action of spring 102 thus rotating bail arm 95 out of operative engagement with reset lugs 93 of transfer levers 85, which then are free to rotate in a clockwise sense due to the action of their individual springs 89 unless prevented by their associated stop lugs 83 of feeler slides 28. That is, if a feeler slide 28 has been permitted to rise due to finding a perforation in the tape, as previously set forth, its stop lug 83 will likewise have been raised out of the path of its testing finger 84 of transfer lever 85. Conversely, if a feeler slide 28 fails to rise, associated testing finger 84 will engage the interposed stop lug 83 and prevent its transfer lever 85 from rotating. When reset lever 98 resumes its clockwise position, bail arm 95 will again engage reset lugs 93 and restore transfer levers 85 to their normal counterclockwise position.

Each transfer lever 85 is also provided with its individual power lug 94 adapted to cooperate with the end of a permutation bar 104, the number of which is equal to the number of transfer feelers 85, namely, six in this instance.

Permutation bars 104 comprise flat steel strips set on edge and guided at each end in slide guides 105 integral with permutation bar guiding unit 106 which is suitably attached to base 17. Each permutation bar thus is adapted to be moved endwise. The top edge of each bar is provided with a series of notches arranged according to the requirements of the signal code. The notches in permutation bars 104 are so arranged that for every combination of setting of the bars, only one notch in each of the bars is in alignment with notches in all of the other bars 104. Each permutation bar 104 is adapted to assume two positions. The normal position is to the right (Figure 2) to which position each bar is urged against its associated power lug 94 by tension of its individual spring 107. Its operated position is to the left by a determined distance, to which position it is urged by its associated power lug 94, propelled by spring 89. Springs 89 and 107 have strength such that spring 107 may move bar 104 to the right, and such that spring 89 may produce upon bar 107 a power double that of spring 107, being thus able to overcome spring 107 and move bar 104 to the left.

Each permutation bar 104 is provided near its right end with two V-shaped notches 112, adapted to cooperate with permutation bar locking or detent lever 113 pivotally mounted at 114 on bracket 35. Lever 113, urged by spring 115, constantly tends to rotate in a clockwise sense into operative relation with the notches in permutation bars 104.

The other end of lever 113 is provided with cam follower roller 116 adapted to engage the periphery of permutation bar detent cam 117. Cam 117 is adapted to force lever 113 in a counterclockwise direction against the action of spring 115 so as to disengage from notches 112 for a brief interval to permit permutation bars 104 to be reset in accordance with a new combination.

Associated with permutation bars 104 are a series of eligible units 131 (Figures 2 and 4) one such unit being provided for each character to be transmitted and hence for each setting of the notches of the permutation bars. Referring to Figure 4, the units 131 are pivotally mounted on a pair of pivot shafts 122 and are adapted to be alternately arranged on either side of permutation bars 104. Said pivot shafts 122 are mounted in suitable brackets 123 fixed to base 17. Each unit 131 comprises a bell crank lever, the substantially horizontal arm 125 of which is provided at its end with a stem portion 126 adapted to carry a series of small rollers 127 which cooperate with the series of permutation bars 104. Stem portions 126 of units 131 are adapted to be guided for vertical motion in slots of the pair of comb bars 128 secured to the sides of permutation bar guide 106. Attached to the free end of each stem 126 are springs 129, the other ends of which are attached to the bottom of comb bar 128. Thus springs 129 tend to draw arms 125 of units 131 against the six permutation bars 104.

Each unit 131 carries at its upper end the insulation 132 and screws 133 which clamp brush 134. Brush 134 cooperates with code disc 135 carried by shafts 15 and 25. Discs 135 are mounted tight upon their respective shafts 15 and 25 and are spaced by conducting collars 136 which connect all discs electrically to the feed disc 141 at the end of each shaft 15 and 25. Discs 137 of insulating material are also placed between code discs 135 to prevent brushes 134 from dropping deeply into the notches of the discs 135. All discs are positioned by rod 138 in proper angular relation and clamped together so that all discs 135 may rotate as a unit.

Each such code disc has associated with it an individual brush 134 with its operating eligible member 131. All brushes 134 are connected to the common wire 139 (Figure 3) and all code discs 135 are connected through shafts 15 and 25 and through the end disc 141 (Figure 2) of the sender to the common wire 142 (Figure 3), the brush for disc 141 always engaging the unnotched surface of the disc. The wires 138 and 142 form a part of the output circuit of the sender as will be disclosed in the description of the electrical circuit. Each code disc 135 has a high radius 143 at each point where a signal is to be transmitted, thereby connecting the wires 138 and 142 at such times.

When the series of notches in permutation bars 104 pertaining to an eligible unit 131 are aligned the selected unit 131 will be rotated slightly as the stem portion 126 with its associated rollers is drawn into the aligned notches by its individual spring 129. Thus brush 134 individual to the selected unit 131 will be rotated into engagement with its associated code disc 135. All code discs 135 are constantly rotating and the selection of a unit 131 and the contact of its associated brush 134 and code disc 135 are properly timed so that said contact will always occur at the proper point on the periphery of the code disc, as described hereinafter.

Located below the stem portions 126 of the units 131 and guided in the permutation bar guide 106, is bail blade 145 (Figures 2 and 4) which is adapted to be elevated to raise the selected unit 131 out of the aligned notches and further to lift all units free from the bars 104 preparatory to the shifting of the permutation bars 104 in accordance with a new combination. Pivotally connected to downward lugs 146 on bail blade 145 are a pair of bell crank levers 147 pivotally mounted in base 17. The other arms of bellcrank levers 147 are pivotally connected to connecting link 148, one end of said link 148 being extended to pivotally connect with arm 149 of bail operating lever 151. Bail operating lever 151 is pivotally connected to permutation bar guide 106. Carried on the other arm of lever 151 is cam follower roller 152 adapted to engage bail operating cam 153 on shaft 21. Thus bail blade 145 normally assumes its downward position as shown in Figures 2 and 4 due to the tension of spring 154, attached to one of the bellcrank levers 147 and suitably secured to base 17.

Referring to Figures 7 and 8 code discs 135 are designed according to a method of prescanning. The character to be sent is divided into any desirable number of sending units of area. The several units of each character thus created are assigned to the edge of the disc 135 individual to that character in the order of scanning and the dark units are made of high radius to engage the brush 134 to send a signal.

This method of and apparatus for pre-scanning each character and providing an electrical transmitting element in accordance therewith is described and claimed in copending application "Facsimile printing telegraph systems and apparatus", Serial Number 475,264 filed August 14, 1930, of which this application is a continuation-in-part.

For an example of prescanning, the letter "R" is shown in Figure 8 together with the blank area between the letter and the preceding letter. It is preferred to leave a blank interval also below the letter so that when the letters are printed in rows one above the other there will be a space or a white line between the rows. This total area is divided into 450 units of area, 25 high and 18 wide. Its corresponding code disc is shown in Figure 7.

Scanning begins at the unit 155 (white) and progresses vertically to the unit 156, continuing immediately at unit 157, again at unit 158, and again from unit 159 to 161, completing the scanning of 78 successive white units, resulting in the low-radius arc 162 on the disc 135 of Figure 7. The scanning of black units extends from unit 163 to unit 164, resulting in the high radius arc 165. Then the three white units 166 to 167 result in the low arc 168 and the 22 high units 169 to 171 result in the high arc 172. Continuing in like manner, scanning of the total area of Figure 8 results in the total arcs on the edge of disc 135 of Figure 7.

Code disc 135 shown to the right in Figure 4 represents the letter "R". Other code discs shown in Figure 2 represent other characters. Every character code disc has the initial starting arc 162 of Figure 7, and all starting arcs 162 are arranged in alignment.

In Figure 7—C is shown a code disc 181 having a continuous high edge. This is the disc for the line-holding signal or idle-line signal. The brush 134 is shown movable for selection.

In Figure 7—B is shown a code disc 183 having a high edge, of 50 degrees angle. This is the disc for the stop signal. The brush 184 for the disc 183 solely is shown fixed and not movable for selection.

Having described in detail the construction of the transmitting apparatus, a description of the general operation of the transmitter will be given.

*Operation of transmitter*

In operation of the transmitting apparatus as just described, as will be understood from the foregoing disclosure a plurality of transmitting discs 135 are secured to shafts 15 and 25, each disc having its periphery so cut that it corresponds to a different character or symbol to be transmitted.

In Figures 7 and 8 the disc for the letter "R" is illustrated, it being understood that each letter of the alphabet and each other character to be transmitted will have a disc whose periphery has varying high and low portions corresponding to the white and black areas of the symbol as if such symbol were scanned.

The transmitting apparatus is started in operation by closing the circuit to the motor 11, thus causing the shafts 15, 21 and 25 to be rotated at the same speed. The speed of the motor 11 may be locally governed by centrifugal switch mechanism such as shown in application No. 475,264 filed August 14, 1930, of which this application is a continuation-in-part, or the speed may be governed by any other suitable speed governing mechanism.

Perforated tape 29 is properly engaged with the feed wheel 32 whereby the tape will advance in step-by-step manner toward the left of the apparatus as viewed in Figure 2. As seen in Figure 6 the tape 29 is a six-hole cross-perforated tape, although transmission may be effected from any other well known forms of tape commonly used in automatic or printing telegraphy. The tape 29 may be perforated by a re-perforator of well known type under control of received telegraphic signals in permutation code from a distant station, or a keyboard perforator of well known design may be operated on the site of the transmitter to directly perforate the tape 29 in accordance with the code combinations of characters to be transmitted.

Irrespective of the method of perforating the tape, transmission of signals by this novel transmitter is controlled by the slackness or tautness of the tape, whereby operation of the transmitter is suspended when the feed of the tape is stopped or slowed down, and the slack is taken up by continued operation of the transmitter. For example, if a keyboard perforator is being used to directly perforate the tape, there must be slack in the tape and the lever 56 must assume the dotted line position (Figure 2) before transmission will start. If the perforator is operated faster than the facsimile transmitter operates, the loop in the tape, or the slack, will increase and the transmitter will continue to operate. If the tape is perforated slower than the transmitter operates, or if perforation stops, the slack in the tape will be gradually taken up by the transmitter until the tape becomes taut. This tautness of the tape will move the bar 56 to the full line position shown in Figure 2, thus moving the lever 51 downwardly and carrying the latch 48 into the path of movement of the arm 47 on lever 33.

Therefore, upon the next counter-clockwise movement of lever 33 under action of its spring 36 after the tape tightens, when the roller 30 thereof leaves the high portion of its cam 27, arm 47 of lever 33 will be latched by the latch 48 and transmission of signals will be suspended, since portion 41 of lever 33 cannot rise to release feeler slides 28. With the parts in this position the motor and the driven shaft continue to rotate but the feeler slides 28 are not allowed to rise and therefore there is no new selection of a character. This control of the transmitter by the tape is also desirable when the speeds of the perforator and the transmitter are not in unison, the control allowing the transmitter to operate as long as it does not transmit faster than the tape advances.

As hereinafter set forth in detail, the novel receving apparatus of this invention operates on the start-stop principle and it is necessary therefore that the transmitter be arranged to transmit start-stop signals to operate receivers. The start-stop synchronizing takes place during the space between letters so that practically no line time is lost. Although the receiving mechanism could be so arranged that it would start upon reception of a current impulse, in this embodiment of the invention the recever is arranged to start when a non-marking or spacing condition is receved over the line, and to be held in stopped condition during continued reception of a marking impulse. Therefore, the transmitter is arranged to operate the start-stop receivers by the following mechanism.

In Figure 7—C the code disc 101 effects an idle-signal condition at the receiver. Its brush 134 is selected and is operated against the disc 181 whenever all permutation slides 104 are at the right in Figure 2, a selection which is produced either by detaining the arm 47 by the latch 48, thus holding down the slides 28 by the bail 41, or by a non-perforated tape which likewise will hold down all of the slides 28 and estop the action of all transfer levers 85.

In Figure 7—B the code disc 183 sends the periodic stop and start signals. Its brush 184 is not subject to selection and the disc 183 makes engagement with the brush 184 at every revolution.

It will be noted that the angles of discs 181 and 183 are such that when disc 181 is selected there will be no start signal, since discs 181 and 183 effect continuous contact between wire 142 and 138 of Figure 3. Should disc 135 be selected repeatedly, the 60 degrees low arc of disc 135 will be occupied by disc 183 which will send a marking signal of 50 degrees for stop and then a spacing signal of 10 degrees for start. The angles may be varied as desired in any specific embodiment of this invention.

Assume that tape 29 is engaged with feed wheel 32, that the tape is taut to engage latch 48 with arm 47, holding bail 41 down and follower 30 up, that motor 11 is running and is driving cams 27, 101, 117, 153 and also driving all of the code discs. Disc 181 is selected by the position of slides 28. Brush 134 engages disc 181, 310 degrees and brush 184 engages disc 183, 50 degrees and a continuous marking signal is transmitted. The mechanical actions are the repeated engagement of cam 27 with cam roller 30 once each revolution of shaft 21, each such engagement acting to lift arm 47 briefly from latch 48, and the repeated lifting of the brush 134 from disc 181 by cam 153 and bail blade 145. This would interrupt the transmitter current but the break is closed by disc 183 and fixed brush 184.

The middle point of the period of engagement of cam 27 and roller 30 will be taken arbitrarily as the zero angle from which a cyclic study of operation will be made. The shaft 21 and cams in Figure 2 are shown about 90 degrees before this zero angle occurs. The timing chart of Figure 4—B shows two cycles of lapsed time. The line 185 indicates the electrical signal as transmitted over the line circuits.

Should a supply of perforated tape be made available, as by beginning operation of a tape perforator, the arm 56 will be freed from the tape and by its weight will lift arm 51 slightly, placing a tension upon spring 53 tending to lift latch 48. At the next zero angle, say the third zero in Figure 4—B, arm 47 will release latch 48 to clear the pathway of arm 47 thus liberating the cam follower arm 33. The release of arm 47 from latch 48 cannot take place until cam 27 and roller 30 act to rotate lever 33 clockwise, thus preventing the skipping of a combination in the tape 29.

The passing of the apex of cam 27 permits slides 28 to rise when holes are found in tape 29. Cam 101 then permits transfer arms 85 to rotate where feelers have risen. Lugs 94 push against permutation bars 104 which are held locked by bail 113. Cam 153 then operates bail 145 to lift all members 125 and cam 117 operates bail 113 to unlock permutation bars 104 briefly, permitting transfer levers 85 to operate permutation bars 104 corresponding to holes found in tape 29. Cam 153 permits bail 145 to descend to effect selection of a code disc; cam 101 permits bail 95 to descend to restore the transfer members; cam 27 forces bail 41 down to restore the feelers and to step tape 29. The bail 145 lifts brush levers 131 from the discs during the time that transfer levers 85 are against the bars 104.

The line signal during the third cycle of Figure 4—B is holding signal (marking) by disc 181 to angle 155 degrees, then stop signal (marking) by disc 183 to angle 205 degrees, at which point a spacing signal is sent for 10 degrees to start the receiver. The character code is sent from angle 215 degrees to angle 155 degrees of the next cycle, when the stop signal by disc 183 begins again.

In two successive codes where a bar 104 is set to the left by spring 89 for the first code and is required to be reset to the right for the second, the feeler slide 28 will not rise on the second code, the transfer lever 85 will not rotate on the second code and when the locking edge 113 is lifted by cam 117 and follower roller 116, the bar 104 will be drawn to the right by power of the spring 107, the bar 104 being stopped in correct position by engagement with its controlling lug 94.

As explained in connection with Figures 7 and 8 there is provided an initial blank or non-contacting segment on each disc corresponding to blank spaces of Figure 8 from point 155 to 159, or referring to Figure 7, corresponding to the non-contacting segment 162. As the discs 135 revolve, signals are transmitted over the outgoing lines in accordance with a scanning of the selected character. However, due to the novel arrangement of providing an electrical contacting segment whose contact portions and non-contact portions correspond to the dark and light areas of the character, actual transmission of signals may take place at a much higher speed than any true scanning operation could transmit corresponding impulses, and therefore transmission of the characters is much more rapid than could be obtained by a scanning operation.

Another important feature of this invention which contributes to the high speed of operation thereof is the overlap whereby transmission of a selected character may be carried on during the period that a subsequent character is being selected and the mechanical parts corresponding to the subsequent character are being positioned to select said character. This is true because the selected unit maintains its contact brush 134 in contacting position during one revolution of the shaft 21, during which the parts are being positioned for the next character.

As previously described, if the tape 29 has become taut due to transmission having been suspended, the latch 48 will engage the portion 47 of lever 33 and retain the feeler slides 28 in their downward position.

This returns the mechanism to the initial position, and the parts pass through the same cycle as above described, to thus successively select holding disc 181 by engaging its individual brush 134 therewith, as long as no tape 29 is fed to the transmitter.

Receiving apparatus

Having fully described the transmitting apparatus pertaining to this invention, a complete description of the preferred form of receiving printing apparatus employed in connection therewith will now be given.

Referring to Figures 9, 10 and 11, in the present embodiment, the receiving unit is provided with a base portion 201, adopted to house local field magnet 202, which will presently be described. Appropriately mounted on base 201 is mounting frame 203 adapted to support the greater portion of the mechanism comprising this unit, said frame including side portions and a vertical back wall.

Referring to Figure 11, a motor 204 (partly shown) provides the motive power used to operate the main or printing shaft 205 of the receiver. Mounted in the side of base 201 is a motor controlling switch of any suitable construction having an operating handle 199. Shaft 205 is journalled in anti-friction bearings suitably mounted for rotation in mounting frame 203 and support 206. Fixed at the end of motor shaft 207 is a driving worm or pinion 208 adapted to mesh with gear 209 fixed to driving member 211 of friction clutch assembly 212 mounted at the end of main shaft 205. Thus rotation is imparted to main shaft 205 by the motor 204 through friction clutch assembly 212.

Referring to Figure 11 and 13, driven member of clutch 212 comprises a sleeve portion 213 fixed to main shaft 205. Sleeve member 213 is provided with flange 214 adapted to cooperate with annular ring 215 to retain friction material 216. Driving member 211 is provided with a recess 217 adapted to receive the flanged portion of driven member 213; and is also provided with hub portion 218 adapted to fit over sleeve 213. Spanning the recess 217 and having frictional contact with the frictional material 216 are a pair of springs 219. Springs 219 may be attached to member 211 in any desired number.

Rotation is thus imparted to shaft 205 from shaft 207 by way of gears 208 and 209, springs 219 bearing against friction material 216 of sleeve 213 which is fixed to shaft 205.

Fixed to the right hand end of shaft 205 is printing or recording wheel 221, which is provided on its cylindrical surface with symmetrical spiral knife edges 222, (Figure 11), which are in contact with tape 224 (Figure 9). Tape 223 constitutes the record receiving surface and tape 224 is a pigment carrying tape such as carbon transfer paper or an ink ribbon of the type used on typewriters.

Under the tapes and opposite printing wheel 221 is the operating member or platen 225 having knife edge 226 arranged transversely of the tapes. Platen 225 is mounted on plunger 227 adapted to be operably held in guide member 228 which is mounted on cover plate 229. Attached to the lower end of plunger 227 in suitable fashion is an armature member 231 of cup form which carries operating winding 232. The function of magnet 202 is to provide a strong magnetic field for cooperation with the magnetism produced by winding 232 to cause platen 225 to rise in response to received signals.

Local field magnet 202, previously mentioned, comprises a core 233, winding 234 and return poles 235, and may be of any suitable design. Core 233 has extension pole 235' which projects into winding 232. Return poles 235 approach windings 232 and are shaped to fit closely. Winding 234 is connected in an obvious circuit, such as that diagrammatically shown in Figure 9.

Since the normal stopping condition of the apparatus is a marking-current condition, the platen 225, as will hereinafter appear, will normally assume its uppermost or stop position. But printing wheel 221 is provided with a gap 236 in the spiral knife edges 222, which, when the wheel 221 is in its arrested position, will be disposed above platen 225 and will permit the platen 225 to rise above its printing position into its stop position.

Adjustably mounted on supporting member 206 Figure 12 and concentric with shaft 205, is orientation plate 237, which is adapted to be accurately adjusted by means of adjusting screw 238 engaging front lug 239 of plate 237. Plate 237 is urged against adjusting screw 238, by spring 240, one end of which is secured to back lug of plate 237 and the other to a spring post on support 206. Support 206 is recessed over an area bounded by the upper edge of the support 206 and a circular arc 206'. Within this depression the plate 237 is held by the shouldered screws 210, which retain it within the depression but do not clamp it against rotation. The plate 237 may rotate through a small angle by effect of a journal-like articulation formed by the circular edge of the plate 237 in continuous engagement with the circular internal edge 206' of the support 206.

Pivotally mounted at 241 on orientation plate 237 is stop-start pawl 242, adapted to co-act with stop disc 243 fixed to main shaft 205. Pawl 242 is provided with latch arm 243' and lever arm 244. Latch arm 243' is provided with latch portion 245 adapted to engage the single tooth 246 on stop disc 243. Arm 243' is also provided with laterally disposed portion 248 adapted to cooperate with adjustable stop screw 249 suitably mounted on front lug 251 of plate 237. Lever arm 244 is provided with a laterally disposed portion 252 of arcuate conformation substantially concentric with shaft 205. Said portion 252 is adapted to be pivotally articulated to one end of stop-start lever 253 substantially as shown in Figure 11. Pawl 242 normally tends to rotate in a counterclockwise sense about pivot 241 (as viewed in Figure 12) due to tension of spring 254 secured to pawl 242 and to plate 237.

Stop-start lever 253 is pivotally mounted on stud 255 fixed to lug 256 integral with mounting frame 203 (Figures 10 and 11). Lever 253 extends beyond stud 255 and its end is bifurcated and is adapted to cooperate with a pair of shoulders 257 formed on the platen 225, (Figures 9 and 10), when the platen rises above its printing position. Lever 253 thus is adapted to oscillate in a clockwise and reverse sense in accordance with the vertical reciprocations of platen 225 above its printing position. Lever 253 normally tends to rotate in a clockwise direction (as viewed in Figure 11) due to the action of spring 254 imparted to it through portion 252, previously mentioned.

Thus while platen 225 assumes its median position due to reception of marking signals, pawl 242 will not be operated. But in response to the stop signal it will rise higher, hence arresting the rotation of shaft 205 and consequently stopping printing wheel 221. When platen 225 is permitted to move to its down position when a spacing starting signal is being received, pawl 242 will be free to oscillate in a counterclockwise sense under the action of spring 254 out of engagement with tooth 246 of disc 243, thus releasing shaft 205 and printing wheel 221 for rotation.

Fixed on shaft 205 for rotation therewith is the worm or pinion 258 (Figure 11) adapted to mesh with the worm gear 259 (Figure 10), fixed on shaft 261. Shaft 261 is vertically disposed and is adapted to be journalled in end thrust bearing 262, of any desired construction, mounted in the base flange 260 of frame 203 and may if desired extend through the top of the base 201. Shaft 261 is also suitably journalled in bracket 263 integral with frame 203. Rotation thus is imparted to shaft 261 through worm 258 whenever shaft 205 is allowed to rotate.

Fixed to shaft 261 and positioned below the worm gear 259 is a bevel gear 264 (Figure 10) adapted to mesh with a corresponding bevel gear 265 fixed to the end of feed roller shaft 266 suitably journalled in frame 203. Fixed for rotation with shaft 266 but disposed on the opposite side of frame 203 is feed roller 267 (Figure 9). Feed roller 267 has a companion presser roller 268 rotatably mounted on a stud 269 fixed to the end of lever arm 271. Lever arm 271 is loosely mounted on stud 272 fixed to frame 203 and is provided with a coil spring 273 adapted to urge said lever 271 in a counter-clockwise direction (as viewed in Figure 9), so that presser roller 268 is thus spring pressed against feed roller 267. Lever arm 271 is also provided with a wing portion 274 to facilitate the manual release of the presser roller 268.

Interposed between rollers 267 and 268 is tape 223. Suitable tape guides 275 and 276 are provided which are adapted to be mounted on suitable brackets 277 secured to frame 203 (Figure 9.) It is apparent from the foregoing that tape 223 is fed to the printing position only when the printing wheel 221 rotates, since shaft 205 carrying the printing wheel and shaft 261 and 266 rotate simultaneously.

*Ribbon reverse mechanism*

Referring to Figure 9. Mounted on frame 203 above printing wheel 221 are a pair of ink-ribbon reels 278 of the type used on typewriters. Ribbon 224 is adapted to wind on one reel while it unwinds from the other and when one reel becomes exhausted the direction of movement of the ribbon is automatically reversed.

Ribbon 224 passes from one reel to the other over a pair of guide rollers 279, 281, thence around a specially constructed ribbon guide 282 partially surrounding printing wheel 221.

Associated with each reel 278 is a detector lever 283, fixedly mounted on rocking shafts 310 and provided with an arcuate end adapted to press against the ribbon.

Each reel 278 is fixed to its individual shaft 284 suitably journalled in frame 203. Fixed to the opposite end of each shaft 284 and on the opposite side of the frame 203 is bevel gear 285, Figure 10. Bevel gears 285 are adapted to mesh with corresponding gears 286 fixed to ribbon feed shaft 287, which is suitably journalled in brackets 288 integral with frame 203.

Ribbon feed shaft 287 is so supported as to move from side to side as well as to revolve, and bevel gears 286 are so positioned on shaft 287 that at any time only one gear 286 will be in mesh with its companion gear 285.

Rotatably fixed to the upper end of vertical shaft 261 is a bevel gear 289 adapted to mesh with a corresponding gear 291 fixed to shaft 292 suitably journalled in brackets 288. Fixed to shaft 292 and close to the right hand bracket 288 (as viewed in Figure 10) is collar 293. Thus gear 291 and collar 293 are adapted to take up the end thrust of shaft 292.

Fixed to shaft 292 is the wide gear 294 adapted to mesh with a narrow gear 295 fixed to ribbon feed shaft 287. Thus, through the foregoing train of gears rotative motion is imparted to ribbon feed shaft 287, whenever main shaft 205 is allowed to rotate.

Gear 295 is provided with an extended hub portion on which is formed rib 296 adapted to cooperated with spring pressed detent 297 mounted on lug 298 integral with frame 203, and constructed substantially as shown in Figure 10, or in any other suitable manner.

Fixed for rotation on shaft 287 is cylindrical cam 299 provided with cam groove 301 adapted to co-act with a cam follower mounted on the end of ribbon reverse lever 302 pivotally mounted on a stud 303 attached to frame 203. Lever 302 is adapted to be resiliently articulated to ribbon reverse bail 304 by means of a pair of coil springs 305, each having one end attached to a common spring post mounted on the end of the lower arm of lever 302, and the other ends secured to parallel arms 306 of bail 304.

Bail 304 is mounted on a pair of studs 307 secured to frame 203 and is adapted to move from side to side by reason of slotted holes associated with studs 307. Rotation of cam 299 will oscillate lever 302 on pivot 303 and will move bail 304 continually to and fro endwise. Carried tight upon each rocking shaft 310 is a lever 312, and carried loosely sleeved upon each rocking shaft 310 is a notched indicator member 311. Each loose member 311 is rotatable upon its rocking shaft 310, is urged by its spring 313 extending to one arm 312, and is stopped by its engagement with arm 312, so that parts 310, 311 and 312 normally move together this assembly moving integrally with the associated rocking shaft 310 and selector lever 283.

Spring 315, attached at either end to one of arms 312, causes arms 312 to rotate toward each other and causes detector levers 283 to rock into contact with the ribbon (Figure 9) and to maintain continuous engagement with the ribbon on the two reels.

In operation, rotation of ribbon feed shaft 287 and cam 299 will cause lever 302 to reciprocate bail 304. Also, as one of the ribbon reels becomes exhausted its associated detector lever 283 will be permitted to move toward shaft 284, and its indicator 311 will be permitted to move into the path of feeler 308 on bail 304. When this occurs, bail 304 will be prevented from moving, the cam-follower pin on lever 302 will become a fixed member and further rotation of cam 299 will move the cam and its shaft 287 to overcome the resistance of detent 297. Shaft 287 will shift to its alternative position endwise, will disengage the bevel gears at one end and will engage the bevel gears at the other end, and further rotation will wind the ribbon upon the alternative reel.

The springs, 313 and 315, prevent undue cramping of bail 304 against its studs 307 and preserve the freedom of movement of bail 304 thus minimizing the strain upon its driving members 305, 302, 299 and others. Should engagement of feeler 308 with indicator arm 311 be such that 308 is urged downward and 311 is urged upward, then spring 315 will yield to permit parts 311, 312, 310 and 283 to rotate, thus protecting bail 304 from undue strain. Should 308 be urged upward and 311 downward, then spring 313 will yield to permit 311 to move away from its engagement with 312.

Operation of receiver

A description of the operation of the receiving apparatus will now be given. Motor 204 is started into operation and rotates main gear 209, which in turn controls the rotation of the main shaft 205 and consequently the printing wheel 221 through the friction clutch 211. As previously described, the main shaft is held from rotation by engagement of pawl 242 with tooth 246 on the stop disc, friction clutch 211 slipping. In the normal operating condition of the apparatus current is impressed on winding 234 of local field magnet 202, as previously mentioned; and also the current through operating winding 232 will move the armature member 231 upwardly. As previously set forth the armature member 231 normally assumes its uppermost position due to reception of a stop impulse from the transmitter.

The processes of recording the signals received by the operating winding 232 may be understood from Figures 9 to 17, from which it will be seen that the preferred form of record is produced mechanically by the direct action of the armature member of a polar magnet without any intermediate actuating mechanical members or translators or modifications.

As hereinbefore set forth, the transmitter described in connection with Figures 2 to 8 operates to transmit marking and spacing conditions in accordance with a scanning of each character, and at the completion of the marking and spacing conditions corresponding to each selected character, the stop condition is transmitted over the line by engagement of the fixed brush with the stop signal disc 183. If transmission is suspended from the transmitter, a continuous stop signal is transmitted by discs 183 and 181 to stop all receivers associated with the transmitter.

The receivers are so arranged that when there is no marking condition being received on coil 232, spring 254, acting through pawl 242 and lever 253, pulls the platen 225 downwardly away from the printing wheel 221. Thus as long as the marking condition controlled by the discs 183 and 181 is being transmitted, each receiver is maintained in stop position.

Portion 236 on printing wheel 221, which is a space in the spiral edges 222, is so arranged that it is above the platen 225 when the receiver is stopped. Therefore, upward movement of platen 225 in response to a marking condition does not mark tape 223 since there are no spiral edges 222 above the knife edge 226 at this time. Tooth 246, Figure 12, secured to main drive shaft 205 is so positioned upon the shaft that the parts are in the position shown in Figures 9 and 12 when the receiver is stopped.

Now when transmission of a character is to be initiated, the transmitter is operated in a manner hereinbefore described, and resetting bail 145 moves upwardly to release previously selected brush 134 from disc 181, leaving brush 184 on stop disc 183. Shortly thereafter the next selected brush 134 drops into operating position to engage in due time the segments of its corresponding disc 135. When the disc 183 moves from under its brush 184, the marking or stop condition on the circuit is broken and spring 254 pulls the platen 225 downwardly. This movement allows lever 253 to move clockwise about its pivot 255, Figure 11, and stop lever 242 then moves counterclockwise (Figure 12) due to its spring 254, thus moving tooth 245 out of the path of movement of tooth 246. Main drive shaft 205 is thus released for rotating and friction clutch, including springs 219 and friction material 216, at once starts shaft 205. Each of the transmitting discs 135 is provided with a spacing arc 162 to provide a time interval without printing signals, to permit a space between characters. In this time interval the stop signal of marking nature is transmitted but the spiral printing edges of the printing wheel are omitted to avoid printing by the stop signal even though it is of marking electrical nature.

The transmitter operates in the manner hereinbefore described to transmit marking conditions in accordance with a scanning of each character, and each such marking condition causes the platen 225 to rise, thus pressing the tapes 223 and 224 against the spiral knife edges 222. The space 236 in the knife edges is of such length that it will have passed from above platen 225 before the first marking condition is received.

Tape 223 will be fed forward progressively by driven roller 267, and the typewriter ribbon 224 will be advanced by way of vertical shaft 261 and cross shaft 292 as previously described in detail. Reversals of the typewriter ribbon feed take place automatically by the reversing mechanism hereinbefore described in detail, since when one spool is nearly exhausted the feeler finger 283 thereof moves the portion 312 and the notched latch member 309 into the path of movement of the reciprocating arm 304 to thus stop reciprocating movement of said arm and causing the drive shaft 287 for the ribbon to reverse its position.

Referring to Figure 14, tapes 223 and 224 are shown as viewed from above in Figure 9. The diagonal lines 222 show a development of the edges 222 of the printing wheel 221. The dotted line 226 is edge 226 of the platen 225 shown dotted because it is below tapes 223 and 224. This line it will be noted is at a slight angle from the normal or transverse line of the tape. At 322 are shown the printed lines which compose the ultimate record as will appear in the description of the operation of the device.

In Figure 9, it will be seen that a movement upward of the armature member 231 will cause the knife edge 226 of the platen 225 to engage the under surface of tape 223 thereby compressing tape 223 and ink ribbon 224 between the knife edge 226 of the armature member 231 and the knife edges 222 of the printing wheel 221. This will cause the transfer of the pigment from ribbon 224 to record tape 223.

Referring to Figure 14, edges 222 of printing wheel 221 have motion over tape 223 in the direction of the arrow 326, due to the turning of the wheel 221, while tape 223 has a slower motion in the opposite direction of the arrow due to the turning of the feed roller 267.

Should the armature member 231 be operated momentarily when knife edge 226 is in the position shown dotted in Figure 14, a dot will be printed upon the tape 223 at the point where the knife edge 226 crosses one of the knife edges 222. Should the action be repeated at a brief interval later, a dot again would be printed, but above the first dot because of the intervening movement of the edges 222. Should knife edge 226 be held by a comparatively long signal, movement of the knife edges 222 would cause a line to be printed upon record tape 223, along the line of the knife edge 226. Owing to the comparatively slow but continuous motion of the tape 223, the line printed upon the record tape does not coincide exactly with the edge 226 but is in the direction of the arrow 327 of Figure 14.

Should the edge 226 be held for a sufficient time, successive lines would be printed upon the tape 223 by the successive edges 222 of the printing wheel and would be so close together on the tape as to produce substantially a solid printing upon the tape. Since a continuous circuit signal would produce a succession of lines which would blacken the entire surface of the record tape, and since the omission of the line signal will leave blank tape, a legible record may be produced by omitting the circuit signal when not needed. This each code disc does, the proper code disc being selected by the selection of its brush 134 by the tape and transmitting mechanism of Figures 2 to 8, whereby there is printed upon record tape 223 characters represented by the permutation code record punched in the sending tape 29, Figure 2.

Should the speed of the receiver correspond exactly to the speed of the sender the record will be as shown upon tape 323 of Figure 15. Should the speed of the receiver be fast as compared to the speed of the sender the record will be as shown upon tape 324 of Figure 16. Should the speed of the receiver be slow as compared to the speed of the sender, the record will be as shown upon tape 325 of Figure 17.

Orientation adjustment of the receiver may be made by adjustment of the screw 238 whose end engages lug 293 of the orientation disc 237. This disc 237, it will be recalled, is secured to mounting 206 by the shouldered retaining screws shown in Figure 12 passing through slots in plate 237. When clamp screw 320 is loosened, adjusting screw 238 may be moved, spring 240 maintaining engagement between lug 239 and adjustment screw 238. Adjustable stop 249 limits the outward movement of latch lever 242 when platen 225 is moved downwardly.

Assembly in manufacture may provide for stopping the printing wheel 221 with the notch 236 above the plate 225. Means for more accurate orientation is needed for service. The friction clutches (Figure 13) may vary in several machines, and variant quicknesses of starting in the friction clutch will require variant distances between the platen edge 226 and the first edge 222 of the printing wheel 221. The quicker start requires the greater angle. This may be adjusted by the orientation devices when the printer is put into service and may be readjusted from time to time as the clutch changes by wear or by reoiling. The volume of current flowing in the armature coil 232 and in the field magnet 202 of the receiver also will jointly control the speed of action on the platen 225 in response to starting signals, and this will vary among the machines as they are manufactured and will vary in any machine in case of any variation in the values of the currents. Variations in speed of response from any cause will displace the record from the center line of the record tape, and the orientation mechanism then will be needed to readjust the device to position the record properly upon the tape.

When shaft 205 has made one complete revolution corresponding in time to less than one revolution of the transmitter, one complete character having been transmitted and received, stop-signal disc 183 with its fixed brush 184 causes transmission of a stop impulse of a marking nature to move the locking tooth 245 into engagement with tooth 246 and the receiving mechanism is stopped. When stop-signal disc 183 disengages from its brush 184, the receiver is released for reception of the next symbol or character. A stop condition is automatically transmitted after the completion of the last marking condition for each symbol, and each of these stop conditions serves to stop all receivers controlled by the transmitter, hence the receivers are automatically synchronized with the sending station.

Thus, the point of the beginning of each character is determined, being determined along the tape by the recurrent equal intervals of transmission-time by the sender, and being determined across the tape by adjustment of the orientation devices at each separate receiver.

The white-tape interval, or space interval between two characters is determined by the running time of the receiver between successive character printings.

The number of edges on the printing wheel 221 corresponds to the number of vertical lines of printing scanning (Figure 8) which comprise the sight of the character, neglecting vertical lines of scanning which comprise the space between characters. The speed of the printing wheel 221 shall be such that successive edges shall pass the platen at the same rate that arcs of sending disc 135 representing each a vertical line of scanning shall pass the sending brush 134. The angle of the printing wheel subtended from edge to edge is greater than the angle of the sending disc subtending the scanning of one vertical row of unit areas. The difference between the contemporaneous angular speeds of printing wheel 221 compared with sending disc 135 is compensated by the stop time of the printing wheel.

The slope of the edge 222 is such that as each edge ceases printing the subsequent edge begins printing, and the angle of slope of the printing edge is determined by the diameter of the printing wheel taken with the angle subtended between analogous points of successive edges.

By providing the receiver with mechanism requiring the condition of a transmitted current for stopping and absence of current for starting, and considering static effects as the equivalent of a brief transmitted current, the effect of static effects upon the start-stop synchronizing is minimized. The stopped receiver may not be started by static effect and thus started out of synchronism. The static effect if occurring briefly just at the end of the normal stop signal may act to extend the stop signal slightly and thus to delay slightly the instant of starting the receiver, and thus may start the receiver slightly out of synchronism for the ensuing character. This will result only in displacing the character slightly upon the record tape and is less objectionable than a false start by static which might occur, were the stop condition a no-current condition and the start condition a current transmission condition.

In the receiver (Figure 9) the armature-member-actuating winding 232 has a vertical motion while requiring continuous conductive connection to the circuits of the system. Flexible conductors 230 are shown for this purpose.

*Transmitting and receiving system*

Having now described the structure and operation of the transmitter and receiver, one preferred transmitting and receiving system will be described, it being understood however that the transmitter and receiver are capable of use in many other systems as pointed out in copending application #475,264.

The upper portion of Figure 1 shows the circuits of the sending station and the lower portion shows the circuits of a typical receiving station.

At the sending station, a piezo-crystal 401 is contained in a heat-insulated chamber indicated by broken lines 402, which chamber contains also heating element 403 and thermostat 404. The temperature of crystal 401 is maintained within limits by element 403 controlled by thermostat 404 with spark-shunt 404' which operates relay 405 over an obvious circuit to interrupt current through element 403 in an obvious manner when the temperature reaches its predetermined upper limit.

Crystal 401 is connected to filament cathode 406 and grid 407 of oscillator valve 408 and is shunted by resistance 409. Source 410 of 200 volts direct current is connected through meter 412 and inductance 414 to plate 415 of valve 408. By the act of closing the heating circuit (not shown) of filament 406, a pulse of current through grid 407 sets this system into oscillation. Crystal 401 acts as a self-varying condenser to vary the potential upon the grid 407. A potential varying at a uniform frequency is produced thus upon wire 416 to condenser 417.

First amplifier valve 420 has filament 421 connected through meter 422 and resistance 423 to grid 424. Source 425 of 500-volt direct current is connected through resistance 426 to screen 427.

Source 425 is connected also through meter 430 to lower end of inductance 432 which has three adjustable contacts. Contact 433 is connected to plate 434. Contact 435 is connected through condenser 436 to lower end of inductance 432. Output contact 437 is connected through condenser 438 to grid 440 of second amplifier valve 441.

Variations in potential created by the valve 408 upon the wire 416 are communicated to the grid 424 thus creating amplified variations through contact 437 and condenser 438 to grid 440.

Second amplifier valve 441 has filament 442 connected through meter 443 and resistance 444 to grid 440. Source 425 is connected through resistance 446 to screen 447 and further through condenser 448 to filament 442.

Source 425 is connected also through meter 450 to lower end of inductance 425 which has three adjustable contacts. Contact 453 is connected to plate 454. Contact 455 is connected through condenser 456 to lower end of inductance 452. Output contact 457 is connected through condenser 458 to grid 460 of first power valve 461.

Variations in potential created by the valve 420 are communicated through contact 437 and condenser 438 to grid 440, thus creating amplified variations through contact 457 and condenser 458 to grid 460.

First power valve 461 has filament 462 connected through meter 463 and resistance 464 to grid 460. Source 465, of 2500 volts direct current, is connected through resistance 466 to screen 467.

Source 465 is connected also through meter 470 and inductance 471 to plate 472. Plate 472 is connected through condenser 473 and adjustable contact 474 to inductance 475, having two other adjustable contacts. Contact 476 is connected through condenser 477 to lower end of inductance 475. Output contact 478 is connected through condenser 479 to grid 480 of second power amplifier valve 481.

Variations in potential created by the valve 440 are communicated through contact 457 and condenser 458 to grid 460, thus creating amplified variations through contact 478 and condenser 479 to grid 480.

Second power valve 481 has filament 482 connected through condenser 483, meter 484 and inductance 485 to grid 480. Winding 490 has three adjustable contacts. Contact 491 is connected to filament 482. Contact 492 is connected through condenser 493 to lower end of winding 490. Source 465 is connected through meter 494 and inductance 495 to plate 496. Plate 496 is connected through condenser 497 to contact 498, thus forming the output circuit of the valve 481 from plate 496 through condenser 497, contact 498, winding 490, and contact 491 to filament cathode 482. Adjustable condenser 499 is connected from the lower end of winding 490 to the grid 480 and is adjusted to prevent local oscillation in the valve 481.

Variations in potential created by valve 460 are communicated through contact 478 and condenser 479 to grid 480 thus creating amplified variations through contact 498 into winding 490.

From winding 490, the output power is transferred inductively to output winding 500 which is connected at one end through adjustable condenser 501 to transmission antenna 502 and which is connected at the other end through meter 503 to counterpoise 504.

The modulating circuit comprises output winding 510 and source 511. The circuit extends from earth through filament cathode 481, grid 480, inductance 485, meter 484, wire 513, output winding 510, source 511 and wire 512 to earth. The modulating system comprises keyed oscillator valve 514 and the keying automatic sender 515 having brush 134 and code disc 135 as described previously herein.

The output circuit of valve 514 comprises filament 516, plate 522, winding 521 and source 520 of alternating current at a frequency of 2000 cycles. The control circuit comprises filament 516, polarizing source 517, resistance 518 and grid 519.

Sender 515 shunts source 517 from grid 519 thus varying the potential of the grid and varying the output current of the valve.

Heat for filaments 406, 421, 442, 462, 482 and 516 may be applied in any known manner.

The general operation of the sender is as follows: All power switches being closed, an even temperature is maintained by element 403. Piezo-crystal 401 and grid 407 are polarized by the source 410 and crystal 401 is self-variable, acting as a varying condenser to cause a cyclic variation in the polarization potential upon grid 407. This cycle is amplified by valve 408, again by valve 420, again by valve 441, again by valve 461 and again by valve 481, whence the cyclic current is applied through inductively related windings 490 and 500 to the antenna 502 for propagation as radiant energy of carrier current energy.

Modulation is effected under control of sender 515 and modulation signals in accordance with the code of disc 135 are effected in the form of telegraphic signals upon the carrier current being transmitted from antenna 502.

The lower portion of Figure 1 shows the circuits of a typical receiving station.

Equipment for conversion of alternating current power is shown. Source 551 is connected to a winding 552 which has three inductively associated windings 553, 554 and 555.

Winding 553 heats six filaments 556, 557, 558, 559, 560 and 561, in the six valves 566, 567, 568, 569, 570 and 571 respectively. The connecting wiring is obvious. An adjustable balance is provided in the bridged resistance 572 with its earthed adjustable contact 573.

Winding 554 is connected to filament 580 and both ends of the winding 555 are connected to the two plates 581 and 582 of the rectifier valve 583. A potential for rectified or direct current is produced upon the output wires 585 and 586. The wave form of the current is modified by passing through condensers 587, 588, 589, 590 and inductances 591, 592, 593 and 594 so that a direct current of desirable smoothness is produced in output wires 601 and 602 of negative potential and wires 603 and 604 of positive potential.

Wire 602 is indirectly earthed over a path from median point of winding 605 and from both ends of winding 605 to the two plates 606 and 607 of valves 570 and 571, thence to the two filaments 560 and 561 and through resistance 572 to point 573 and to earth.

Wire 601 is indirectly earthed (a) through resistance 610 winding 614, plate 615, cathode 616 and resistance 612 to earth; (b) through resistance 620, resistance 622, inductance 625, plate 630, cathode 631 and resistance 627 to earth; (c) through inductance 635, plate 640, cathode 641 and resistance 642 to earth; (d) through inductance 645, plate 646, cathode 647 and resistance 642 to earth; (e) through resistance 650, 651, 654 and resistance 642 to earth.

Filaments 556, 557, 558 and 559 heat cathodes 647, 641, 631 and 616 respectively.

Antenna 701 is connected through winding 702 to earth. Winding 703 is inductively related to winding 702, is connected from earth to grid 704 of valve 566 and is shunted by variable condenser 705 for tuning.

Radiant energy received from antenna 502 upon antenna 701 will be transferred to grid 704.

Output circuit for valve 566 is (d) above, with a derived circuit through condenser 710 and upper part of inductance 711 to grid 712, with variable condenser 713 shunted around inductance 711 for tuning.

Energy received upon grid 704 thus will be amplified and transferred to grid 712 of valve 567.

Output circuit for valve 567 is (c) above, with a derived circuit through condenser 636 and upper part of inductance 637 to grid 715 with a variable condenser 638 shunted around inductance 637 for tuning.

Energy received upon grid 712 thus will be amplified and transferred to grid 715 of valve 568.

Output circuit for valve 568 is (b) above, with a derived circuit through condenser 626 and a second derived circuit through condenser 623 to grid 716. Condenser 626 and inductance 625 form a filter pair which by-passes the radio-frequency to earth through condenser 626 and passes the signal component through inductance 625.

Telegraphic signals received upon grid 715 thus will be amplified and recovered and transferred to grid 716 of valve 569.

Output circuit for valve 569 is (a) above and telegraphic signals received upon grid 716 are amplified and transferred to the winding 614.

Winding 721 is inductively related to winding 614. Its median point is connected to power wire 603 and its two ends are connected to the two grids 722 and 723 respectively. The output circuit of the valves 570 and 571 is the path from power wire 602 to earth as described above through winding 605 which has the inductively related winding 724.

Telegraphic signals received upon grid 716 thus will be amplified and transferred first to winding 614 then to winding 721 then to grids 722 and 723; then again amplified and transferred through winding 605 to winding 724.

Winding 724 is connected to the springs 730 and 731 of manual switch 732. Four unidirectional valves 733, 734, 735, 736 are connected in series parallel connection with negative poles of 735 and 736 connected by wire 737 to one terminal of the winding 232 of the receiver of Figures 9 to 18 and with positive poles of 733 and 734 connected by wire 738 to the other end of winding 232.

Switch point 740 is connected by wire 741 to negative pole of valve 734 and to positive pole of valve 733. Switch point 742 is connected by wire 743 to negative pole of valve 733 and to positive pole of valve 735.

The circuit for the winding of magnet 202 is from earth, through magnet 202, wire 604, wire 586, winding 555, plates 581 and 582, filament 580, wire 585, inductance 591 to wire 602 and to earth as described; also through inductance 592 to wire 601, and to earth. It will be understood that magnet 202 may be energized by other sources, such as shown in Figure 9, for example.

The telegraphic signal in the winding 724 will be an alternating current as of the generator 520 and intermittent in code manner corresponding to the code contacts within the sender 515.

Current pulses flowing upward through winding 724 will pass through spring 730, point 742, wire 743, valve 733, wire 738, winding 232, wire 737, valve 736, wire 741, point 740, spring 730 to winding 724, passing thus through winding 232 right to left.

Current pulses flowing downward through winding 724 will pass through spring 731, point 740, wire 741, valve 734, wire 738, winding 232, wire 737, valve 735, wire 743, point 742, spring 730 and to winding 724, passing thus through winding 232 right to left.

Each marking signal of alternating current thus is rectified in the winding 232 and results in lifting the platen 224 (Figure 9) to produce a marking effect upon the record tape, or to operate the stop device 242 (Figure 12) to stop the printing wheel.

The valves 734 to 737 may be of the dry metallic type, which operates effectively with large currents at low potentials such as are most suitable for the receiving and recording device as described.

The switch springs 730 and 731 have the further points 750 which are connected by wires 752 to loudspeaker 753.

The general operation of the receiving system is as follows:

The equipment from item 551 to 724 inclusive, together with switch 732 and loudspeaker 753, constitutes a complete and ordinary radio-broadcast receiving set of any desired type suitable for the reception of broadcast telephonic entertainment. To the switchpoints 740 and 742 is added the printing receiver constituting a part of the present invention.

Telegraphic signals received upon antenna 701 as radio frequency modulated in volume by voice frequency are amplified by valves 566, 567 and 568. The voice frequency component is separated by the filter-set 625, 626 and is amplified by valves 569, 570 and 571, and thence by winding 605, 724 and switch 732, is passed to speaker 753 if telephonic or to platen winding 232 if telegraphic.

Thus a user may connect this novel printing receiver with his radio receiver and at will switch from the usual radio broadcast to news bulletins such as stock quotations. The cost of the printing receiver can be low, and since most homes today are usually provided with a radio receiver, the printing receiver can be connected thereto at little expense. Furthermore, the printing receiver may be built into the radio receiver when the same is manufactured, this combination being an attractive one which may be sold at only a relatively small additional cost above that of the radio receiver alone.

*Alternative transmission method*

A modification in which printing is effected by the transmission condition of no-current manifests a minimum annoyance from static. Since static is manifested as a condition of current in the transmission line, it becomes objectionable by supplying a line-current condition when that condition is not desired. When a line-current is desired and is being supplied by the sending station, the static has no effect upon the receiver, the system being in a condition of self-protection against static at such times.

It is desirable therefore to design such a system as will divide its line time into a maximum time component of line-current transmission condition and a minimum time component of no-current condition. This I attain by using line-current condition for non-printing signal and for stop signal, and by using no-current line condition for printing signal and start signal.

To effect this modification certain differences are required from the apparatus as before described. The scanning disc of Figure 7 has its high and low arcs reversed in the code-sending arc from 305 degrees to 245 degrees as shown, the reversed disc being shown in Figure 18. A spring is added to the armature member of Figure 9 to urge the platen toward the printing wheel when line-current condition is not being received, as shown in Figure 19. The polarities of the field and armature windings are so related that the line-current condition will cause the platen to move away from the printing wheel, and against its spring. The latch-and-disc articulation is reversed in the stop-start mechanism, so that the line-current condition of "platen down" may stop the printing wheel, as shown in Figure 20. The clearance arc 236 in the printing wheel 221 is still required so that the start pulse of no-current condition may permit the platen to rise without marking the record tape.

With this modification, a static pulse may cause the omission of a microscopic portion of a black line. This may be compared with the principal description, above, in which a static pulse will produce a black dot upon the record tape.

In code disc 330, Figure 18, the arc from 245 degrees to 305 degrees is low as in disc 135, Figure 7. The component small arcs from 305 degrees to 245 degrees following the scanning areas of Figure 8 with high arcs correlated to white areas and low arcs correlated to black areas. When discs such as 330 are substituted for discs such as 135 in the sender of Figure 4, with discs 183 and 181 unchanged, the transmitted signals will be as follows: For stop signal, current; for starting signal, no current; for printing signal, no current; for non-printing signal, current.

The labels, 245 degrees and 305 degrees, Figures 7 and 18, indicate that radius of the disc which is in engagement with brush 134 at the time when operating cam shaft 21 (Figures 2 and 4) is in its position at the angle indicated by the label.

In Figure 19, a modification is shown for the structure shown in Figure 9. The compression spring 333 is added, between the cup-form armature member 231 and the adjustable member 334. The effect of this spring is to urge platen 225 toward printing wheel 221 with such force that printing will be effected when the wheel is moving. To avoid printing when the wheel is moving, field magnet 202 has such polarity that a received line signal flowing through winding 232 will draw the cup 231 and platen 225 downward.

In Figure 20 are shown two members constituting a modification of the mechanism of Figure 12. The toothed disc 243 and tooth 246 of Figure 12 are replaced by the notched disc 343 and notch 346 in Figure 20. The tooth 245 is omitted from arm 243' of Figure 12 and is replaced by tooth 345 on arm 344. Items of start-stop lever 253, spring 254, pivot 241 and lug 248 are unchanged.

In operation, when in motion, disc 343 engages tooth 345 continuously and depresses tooth 345. When the notch 346 reaches the tooth 345, the tooth may rise, may engage the notch and may stop the shaft 205 until the tooth is depressed.

In general, the operation of printing with this modification comprises the two alternative conditions of permitting the spring 333 to effect printing, there being no current in winding 232, and of passing a signal current through winding 232 preferably of strength just sufficient to ease the pressure of platen 225 so that printing is not effected. The measured movement of platen 225 from printing position to non-printing is very small, the printing resulting from squeezing or non-squeezing tapes 223 and 224 rather than contact and non-contact of the platen with the tapes.

Throughout the intervals of printing, disc 343 is engaging tooth 345, holding the tooth down, therefore holding down the arm 344 and holding down the left end of start-stop lever 253 thus lifting the right end or forked end of lever 253 free from shoulders 257. During the intervals of printing there is no influence of parts 253 and 257, of either upon the other. Magnet 202 and winding 232 thus effect their functions of printing and starting alternatively and are not burdened by either function when performing the other.

When the printing angle of one rotation of wheel 131 has been traversed, notch 346 passes under tooth 345, arm 344 and left end of lever 253 rise, right end of lever 253 descends and engages shoulders 257 of platen 225, now in "down" position because of the stop-signal current through winding 232. Tooth 345 engages the radial edge of notch 346 and so stops the disc and the shaft.

Upon receipt of the starting signal of "no current", the armature members 231 and 225 will be released; spring 330 will lift platen 225; shoulders 257 will lift the right end of lever 253, thus depressing the left end of 253, arm 344 and tooth 345, releasing notch 346 and permitting disc 343 and shaft 205 to start.

Referring to Figure 9—B an enlarged detail is shown of platen 225 its shoulders 257 and the forked end of the start-stop lever 253. Three arrows, 326, 337 and 338 show three positions of the shoulder 257.

When printing, the shoulder operates between position 336 and 337, being stopped by engagement with the printing wheel and tapes before it can engage the arm 253. The platen thus operates without any burden from the start-stop mechanism when it is performing the function of printing. When the notch of the printing wheel comes opposite platen 225, the platen is permitted to rise and to engage and operate the start-stop lever 253. The platen thus operates the start-stop function without any burden from the function of printing. The distance from 336 to 337 may be .005 inch and from 337 to 338 may be .015 inch.

In Figure 22, the switch 340 may attach the rectifiers 733—736 and the printer 232 to receive signals from the winding 724 without disconnecting the loudspeaker 753. Sounds in the loudspeaker will serve as audible pilot signals to announce the receipt of electrical signals to which the printer should respond.

*Alternative line*

For systems of a few stations, for private transmission, for intercommunication systems and for exchanges of telegraphic or telephonic nature, it may be more convenient to provide metallic line conductors than to provide radio transmission. Such a private line is shown in Figure 21 with four stations, three of which are sending and receiving, the fourth being for receiving only.

In Figure 21, stations 350, 351, 352, 353 are connected by signal wire 354 in three sections and by earth return, with battery 358 and resistance 360.

In operation, the signaling current flows from earth through source 358, resistance 360, sender 134, 181, winding 232 representing a complete printer, line sections 354 and other senders and printers at other stations as 351, 352, 353, returning through earth.

Any sender 134, 181 may transmit character signals and all printers 232 will record them. The initiating station may send messages and receive replies.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. In a facsimile telegraph system, a transmitter having a plurality of similar transmitting elements each having control surfaces corresponding to the light and dark areas of a scanned character, and an additional similar transmitting element for transmitting a stop condition to all receivers connected to said transmitter.

2. In a facsimile printing telegraph system, a transmitter having means to transmit a series of marking conditions for facsimiling each symbol and means to transmit a stop signal of a marking nature after each such series of facsimile marking conditions, a receiver having printing means responsive to print in response to said marking conditions, and a stop mechanism on said printing means operative to stop said receiver upon receipt of a stop signal of marking nature.

3. The invention as defined in claim 2 wherein said stop mechanism is arranged to start said receiver upon cessation of the stop signal of marking nature.

4. In a facsimile printing telegraph transmitter, a plurality of transmitting elements, one for each symbol, each having control surfaces corresponding to the light and dark areas of a scanned symbol, a contact for each transmitting element, a plurality of code bars selectively positionable in code combinations to select one contact, said transmitting elements and their contacts arranged on both sides of said code bars.

5. In a facsimile telegraph system for symbol-by-symbol transmission, a receiver having a driven printing mechanism to facsimile a symbol by a group of marking and spacing condition signals, a facsimile magnet for receiving said signals, a stop device for said printing mechanism, said stop device operable but once for each complete facsimile symbol, and means including said facsimile magnet to release said stop device upon reception of an initial signal of one group.

6. In a facsimile telegraph system for symbol-by-symbol transmission, a receiver having a driven printing mechanism, said printing mechanism being operative upon reception of a group of signals of marking and spacing nature to facsimile each received symbol upon a receiving element, a stop device for said printing mechanism engaging said printing mechanism in response to a stop signal and released upon reception of the initial signal of a group, said stop device operable but once for each symbol, and a single magnet for said printing mechanism and said stop device.

7. The invention as defined in claim 6 wherein said printing mechanism is provided with means whereby the stop signal does not mark the receiving element.

8. In a facsimile telegraph system, a receiver having a driven printing wheel provided with a plurality of spiral printing edges, a platen having a printing edge for compressing a receiving element between said platen and wheel to be marked by movements of said platen in response to received signals and a stop device preventing movement of said printing wheel and operable by a movement of said platen, said printing wheel having a blank segment without printing edges whereby stop-movements of said platen will not mark said receiving element.

9. In a facsimile telegraph receiver, a driven printing wheel, a polarized magnet, means to facsimile directly from the armature of the magnet on a receiving element, a stop device for said printing wheel operated by the armature of said magnet, and means for adjusting said stop device whereby the stop position of said printing wheel may be varied.

10. In a facsimile telegraph receiver, a driven printing wheel, a platen movable in response to received signals of marking and spacing nature to facsimile symbols on a receiving element, a stop device for said printing wheel and operable by said platen, and means for adjusting said stop device with relation to the platen.

11. In a facsimile printer for printing upon a record material, marking means within the facsimile printer for marking upon said material, and mechanical means subject to control by received code signals of current for restraining said marking means in code manner during the formation of characters and for stopping said printer between characters.

12. In a start-stop printing telegraph receiver, a rotatable platen wheel for printing upon a tape, a movable printing member operable by received signals to print facsimile records upon said tape, and having a limited extent of motion when performing its function of printing, and a stop-start mechanism operable by said member and engaged by said member at a point outside of the limits of its motion for printing.

13. In a start-stop printing telegraph receiver, a printing wheel having printing edges for printing upon a receiving tape, a movable printing member operable by received signals and movable to press said tape against said printing wheel to print facsimile symbols upon said print-receiving tape, said wheel having a notch, said notch positioned opposite said printing member when said wheel is in stop position whereby said printing member may enter said notch and may move beyond its printing position, and stop means engageable by said printing member when beyond its printing position.

14. In a start-stop facsimile printing telegraph receiver, a movable printing member for producing facsimile records, a start-stop member adapted to engage said printing member for control by received signals other than facsimile printing symbols, and a cam member engaging said start-stop member to remove it from engagement with said printing member during the period of printing.

15. In a start-stop facsimile printing telegraph receiver, a movable printing member for producing facsimile records, start-stop mechanism operable by said member between periods of facsimile printing by said member, and means for removing said start-stop mechanism from said printing member during the period of printing.

EDWARD F. KLEINSCHMIDT.